United States Patent Office 2,732,363
Patented Jan. 24, 1956

2,732,363

POLYMERIZATION OF ACRYLONITRILE IN THE PRESENCE OF PREFORMED INTERPOLYMERS

Harry W. Coover, Jr., and Joseph B. Dickey, Kingsport, Tenn., assignors to Eastman Kodak Company, Rochester, N. Y., a corporation of New Jersey No Drawing. Application October 21, 1952,
Serial No. 316,058

17 Claims. (Cl. 260—45.5)

This invention relates to the polymerization of acrylonitrile in the presence of preformed interpolymers and to articles obtained therefrom.

This application is a continuation-in-part of our copending application Serial No. 198,762, filed December 1, 1950, now Patent Number 2,657,191, wherein we have shown that valuable polymer products can be obtained by polymerizing acrylonitrile in the presence of interpolymers of acrylamides, itaconamides, citraconamides, esters of acrylic and methacrylic acids and vinyl carboxylic esters with monoethylenically unsaturated, polymerizable organic compounds containing a —CH=C< group.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 percent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye susceptible. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers and standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homongeneous condition of the spinning solution and the fact that it is generally known that polyacrylonitrile is not compatible with many organic substances.

We have now made the unusual and valuable discovery that stable solutions of acrylonitrile polymers which do not separate into distinct layers on standing, and from which fibers of homogeneous character can be spun, can be prepared by polymerizing acrylonitrile in the presence of certain other preformed interpolymers which have not been separated from their polymerization medium prior to the addition of monomeric acrylonitrile. These fibers are characterized by a softening point higher than the interpolymers referred to above, and do not exhibit the segmentation defect shown by many of the fibers prepared from certain prior art materials comprising polyacrylonitrile.

It is known that polymers of acrylonitrile can be prepared by interpolymerizing acrylonitrile with a monoethylenically unsaturated compound and adding additional acrylonitrile during the course of the polymerization. The interpolymers thus obtained are subject to many of the deficiencies of the interpolymers referred to above in that their softening points are too low to permit their use in the preparation of synthetic fibers and yarns. Our new polymeric compositions are distinguished therefrom in that the interpolymerization of the original polymerization mixture of our invention is substantially complete before the added acrylonitrile is subjected to polymerization conditions. The acrylonitrile thus is able to extend the length of the interpolymer chain with units consisting entirely of acrylonitrile, and the product has the valuable tenacity and high-softening properties of polyacrylonitrile, while the new and important property of dye susceptibility is imparted thereto.

It is, therefore, an object of our invention to provide acrylonitrile polymer compositions. A further object of our invention is to provide methods for making these modified polymer compositions. Still another object is to provide homogeneous solutions obtained from these polymer compositions comprising acrylonitrile. Another object is to provide fibers from these homogeneous solutions, and methods for making these fibers. Other objects will become apparent from a consideration of the following description and examples.

According to our invention, we provide polymer compositions comprising acrylonitrile by polymerizing acrylonitrile in the presence of a preformed interpolymer which has not been separated from its polymerization medium prior to the addition of the acrylonitrile. When the preformed interpolymer is separated from its polymerization medium, and redissolved in a solvent, or suspended in an aqueous medium, all of the reactive groups in the interpolymer chain are apparently closed, or rendered inactive, and polymerization of the acrylonitrile with this separated interpolymer causes a substantial lowering of softening point in certain instances. When the acrylonitrile is added to the preformed interpolymer before separation of the interpolymer from the reaction medium, a certain number of groups in the interpolymer chain apparently remain reactive, and the acrylonitrile is able to increase the length of the interpolymer chain. The compositions obtained according to our invention are not to be confused with simple interpolymers which have a low softening point as has been noted above.

The preformed interpolymers which are useful in practicing our invention can be prepared by interpolymerizing monoethylenically unsaturated, polymerizable, organic compounds containing a (I)                 —CH=C< group according to methods well known to the art. We have found that interpolymers especially useful in practicing our invention can be prepared by interpolymerizing from 1 to 99 percent by weight of one of the compounds selected from those represented by Formula I above with from 99 to 1 percent by weight of a different monomeric compound selected from the maleamides, fumaramides, maleamates, fumaramates, itaconamates and citraconamates. When from 5 to 95 parts by weight of acrylonitrile is added to from 95 to 5 parts by weight of the interpolymer, and the mixture heated in the presence of a polymerization catalyst, until the added acrylonitrile is substantially polymerized, particularly useful compositions are obtained. The final compositions containing about 60 to 95 percent by weight of acrylonitrile in the polymer molecule have been found to be especially useful for fiber-forming materials. However, all of our final compositions containing about 5 to 95 percent by weight of acrylonitrile are compatible with each other, with polyacrylonitrile, or with other acrylonitrile polymers containing at least 85 percent by weight of acrylonitrile, in all proportions, the most useful mixtures being from 5 to 95 parts by weight of one or more of the polymers of the invention with from 95 to 5 parts by weight of polyacrylonitrile. Monomers, whose polymers were not heretofore compatible with polyacrylonitrile, can thus be polymerized according to our invention to give polymers which are compatible with polyacrylonitrile.

The maleamides which can be advantageously used in our invention are selected from those represented by the following general formula:

(II)

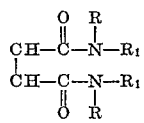

wherein R and $R_1$ each represents a hydrogen atom or an alkyl group containing from 1 to 4 carbon atoms (e. g. methyl, ethyl, propyl, isopropyl, n-butyl, isobutyl, etc. groups). Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, we can advantageously use those represented by the following general formula:

(III)

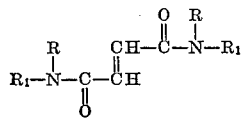

wherein R and $R_1$ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'butyl fumaramide, N,N'-tetramethyl fumaramide, N,-N'-tetraethyl fumaramide, N,N-dimethyl-N',N'-diethyl fumaramide, etc.

As maleamates, we can advantageously use those represented by the following general formula:

(IV)

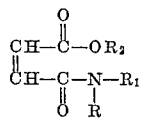

wherein R and $R_1$ are as above defined and $R_2$ represents an alkyl group of from 1 to 4 carbon atoms. Typical maleamates include methyl maleamate, ethyl maleamate, propyl maleamate, n-butyl maleamate, N-methyl methyl maleamate, N-ethyl methyl maleamate, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, we can advantageously use those represented by the following general formula:

(V)

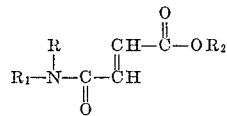

wherein R, $R_1$ and $R_2$ are as above defined. Typical fumaramates include methyl fumaramate, ethyl fumaramate, propyl fumaramate, n-butyl fumaramate, N-methyl metyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, we can advantageously use those represented by the following general formulas:

(VI)

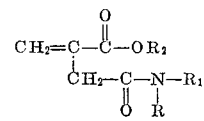

(VII)

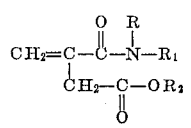

wherein R, $R_1$ and $R_2$ are as above defined. Typical itaconamates include methyl itaconamate, ethyl itaconamate, propyl itaconamate, the butyl itaconamates, N-methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, N-dibutyl methyl itaconamate, etc.

As citraconamates, we can advantageously use those represented by the following general formula:

(VIII)

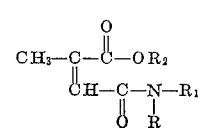

(IX)

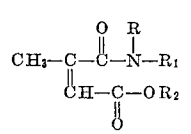

wherein R, $R_1$ and $R_2$ are as above defined. Typical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamate, etc.

The monoethylenically unsaturated, polymerizable organic compounds represented by Formula I above include the compounds represented by Formulas II, III, IV, V, and VI to X, in addition to other monomeric compounds coming within the scope thereof, such as styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinylphthalimide, ethylene, etc. Especially useful polymerizable compounds coming within the scope of Formula I comprise those containing a (X) 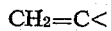

group and an amido nitrogen atom, for example, the acrylamides, itaconamides, citraconamides, and esters of acrylic and methacrylic acids and vinyl carboxylic esters.

In preparing the polymer compositions of our invention, the interpolymerization comprising the first step of our process is continued until substantially complete, i.e., further heating produces no additional polymerization, and the acrylonitrile monomer is then added and the polymerization continued until the acrylonitrile is substantially polymerized, i.e. from about 90 to 100 percent.

The polymerization is advantageously carried out in an aqueous medium, although other reaction media, such as organic solvents, can be employed; for example, a polymerization medium consisting of aqueous acetone, or other aqueous solvent can be used.

The polymerizations can be accelerated by the use of a well-known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e.g. alkali metal perborates, such as those of sodium and potassium, etc.), persulfates (e.g. alkali metal ammonium persulfate, etc.). Other catalysts such as the ketazines, azines, etc. can be used. The quantity of catalyst used can be varied, depending on the monomer, amount of diluent, etc. Sufficient catalyst can be used to interpolymerize the ethenoid monomers selected from those represented by the above general formulas, and the added monomeric acrylonitrile, or an amount of catalyst sufficient to interpolymerize only the ethenoid monomers can be used, and additional catalyst can be added with the acrylonitrile monomer to complete the polymerization. The catalyst added along with acrylonitrile may be the same catalyst that was used to polymerize the other ethenoid monomers. We have found that it is especially advantageous to use an amount of catalyst sufficient to interpolymerize only the initial monomers, and then upon addition of the acrylonitrile to add a further amount of catalyst at that time. This procedure provides a readier means for regulating the molecular weight distribution of the polymer composition.

The temperatures at which the process of our invention can be carried out vary from ordinary room temperature to the reflux temperature of the reaction mixture. Generally, a temperature of from 25° to 75°C. is sufficient.

If desired, emulsifying agents can be added to the reaction mixture to distribute uniformly the reactants throughout the reaction medium. Typical emulsifying agents include the alkali metal salts of certain alkyl acid sulfates (e.g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated esters, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e.g. potassium, sodium, etc. bisulfites) can be added to reduce the time required for the polymerization to be effected.

The following examples will serve to illustrate further the manner whereby we practice our invention.

*Example 1*

2.5 g. of fumaramide and 0.5 g. of acrylonitrile were emulsified in 75 cc. of distilled water containing 0.05 g. of ammonium persulfate, 0.05 g. of sodium bisulfite and 1 g. of a sulfonated ether (Triton 720). The resulting emulsion was then heated at 35°C. for 12 hours. There were then added 7 g. of acrylonitrile, 0.1 g. of ammonium persulfate and 0.1 g. of sodium bisulfite, and the polymerization mixture was heated at 35°C. for an additional 12 hours. The precipitated polymer was obtained in 85 percent yield and contained 21 percent by weight of fumaramide. Fibers spun by extruding a solution of the polymer product in N,N-dimethylformamide into a precipitating bath had a softening temperature of 210°C. and showed excellent affinity for dyes.

Fibers obtained from a solution of a mechanical mixture of 5 parts polyacrylonitrile and 95 parts of the above polymer and extruding the solution into a precipitating bath, had a tenacity of 3.2 g. per denier, an extensibility of 23 percent, and a sticking temperature of 210°C.

*Example 2*

1 g. of acrylonitrile and 2 g. of N,N'-dimethylfumaramide were emulsified in 100 cc. of distilled water, having dissolved therein 0.05 g. of potassium persulfate, 1 g. of orthophosphoric acid and 2 g. of aryloxpolyalkylene sulfonate ether (Triton 720). The emulsion was then heated at 50°C. for 12 hours. There were added 7 g. of acrylonitrile, 0.1 g. of potassium persulfate and and 0.1 g. of sodium bisulfite to the cooled reaction mixture and heating was resumed for 8 hours at 35°C. The precipitated polymer was obtained in 90 percent yield and contained 18 percent by weight of N,N'-dimethylfumaramide. Fibers spun by extruding a solution of the polymer product in N,N-dimethylformamide into a precipitating bath had a softening point of 220°C. and showed excellent dye susceptibility.

*Example 3*

1 g. of N,N,N',N'-tetramethylfumaramide and 1 g. of N,N-dimethylacrylamide were emulsified in 50 cc. of water containing 0.05 g. (calculated as 100 percent) of hydrogen peroxide, 0.5 g. of oxalic acid and 2 g. of aryloxypolyalkylene sulfonated ether (Triton 720) and the solution was heated at 50° C. for 12 hours. The solution was cooled to room temperature and 8 g. of acrylonitrile and 0.1 g. (calculated as 100 percent) of hydrogen peroxide were added. Heating was then continued for an additional 16 hours at 50° C. The precipitated polymer was obtained in an 85 percent yield and contained 8 percent by weight of N,N,N',N'-tetramethylfumaramide and 9 percent by weight of N,N-dimethylacrylamide. Fibers spun by extruding a solution of the polymer product in N,N-dimethylformamide into a precipitating bath, had a softening point of 210° C. and showed excellent affinity for dye.

The polymers can be mixed with polyacrylonitrile in all proportions and dissolved to give stable solutions which do not separate into distinct layers on standing and from which fibers and films of homogeneous character can be spun, extruded or cast.

*Example 4*

1 g. of N,N'-di-isopropylfumaramide and 1.5 g. of N,N'-diethylmaleamide were emulsified in 100 cc. of distilled water having dissolved therein 0.05 g. of ammonium persulfate, 0.05 g. of sodium bisulfite and 3 g. of potassium laurate. The solution was then heated at 40° C. for 12 hours, at the end of which time the solution was cooled to room temperature. There were then added 7.5 g. of acrylonitrile, 0.1 g. of ammonium persulfate and 0.1 g. of sodium bisulfite and the reaction mixture was heated an additional 12 hours at 35° C. The precipitated polymer was obtained in a 92 percent yield and contained approximately 21 percent by weight of the fumaramide and maleamide. Fibers spun by extruding a solution of the polymer product in N,N-dimethyl-formamide into a precipitating bath had a softening point of 220° C. and showed good affinity for dyes.

Fibers obtained from a solution of a mechanical mixture of 95 parts polyacrylonitrile and 5 parts of the above polymer and extruding the solution into a precipitating bath, had a tenacity of 3.5 g. per denier, and extensibility of 23 percent, and a sticking temperature of 225° C.

*Example 5*

1 g. of methylmethacrylate and 2 g. of N,N'-dimethylmaleamide were dissolved in 50 cc. of acetonitrile containing 0.5 g. of benzoyl peroxide and the solution was heated at 50° C. for 24 hours. The solution was cooled to room temperature and 7 g. of acrylonitrile and 0.1 g. of benozyl peroxide were added. The reaction mixture was then heated at 50° C. for an additional 16 hours. The precipitated polymer was obtained in a 93 percent yield and contained 17 percent by weight of N,N'-dimethylmaleamide on analysis. Fibers spun by extruding a solution of the polymer product obtained above in N,N-dimethylacetamide into a precipitating bath had a softening point of 215° C. and showed excellent affinity for dyes.

The polymers can be mixed with polyacrylonitrile in all proportions and dissolved to give stable solutions which do not separate into distinct layers on standing and from which fibers and films of homogeneous character can be spun, extruded or cast.

*Example 6*

1 g. of vinyl acetate and 1 g. of N-methylfumaramate were suspended in 18 cc. of distilled water containing 0.02 g. of ammonium persulfate, 0.02 g. of sodium bisulfite and 1.1 g. of Triton 720 (a sulfonated ether). The resulting emulsion was then heated at 50° C. for 16 hours. After cooling to room temperature, a dispersion of 8 g. of acrylonitrile, 0.1 g. of ammonium persulfate and 0.1 g. of sodium bisulfite and 1 g. of Triton 720 (a sulfonated ether) in 50 cc. of distilled water was added. The reaction mixture was then tumbled at 50° C. for 12 hours. The precipitated polymer weighed 9.7 g. and contained 9 percent by weight of N-methylmethylfumaramate and 10 percent by weight of vinyl acetate on analysis. Fibers spun by extruding a solution of the polymer product in N,N-dimethylformamide into a precipitating bath, had a softening point of 210° C. and showed good dye affinity.

The polymers can be mixed with polyacrylonitrile in all proportions and dissolved to give stable solutions which do not separate into distinct layers on standing and from which fibers and films of homogeneous character can be spun, extruded or cast.

Fibers obtained from a solution of a mechanical mixture of 50 parts polyacrylonitrile and 50 parts of the above polymer and extruding the solution into a precipitating bath, had a tenacity of 3.3 g. per denier, an extensibility of 22 percent, and a sticking temperature of 210° C.

*Example 7*

2 g. of N,N-dimethylethylfumaramate and 1 g. of methylfumaramate were suspended in 20 cc. of distilled water containing 0.02 g. of ammonium persulfate, 0.02 g. of sodium bisulfite and 1 g. of Triton 720 (a sulfonated ether). The resulting emulsion was then heated at 50° C. for 16 hours. After cooling to room temperature, a dispersion of 7 g. of acrylonitrile, 0.1 g. of ammonium persulfate, 0.1 g. of sodium bisulfite and 1 g. of Triton 720 (a sulfonated ether) in 50 cc. of water was added. The dispersion was tumbled end over end at 50° C. for an additional 12 hours. The precipitated polymer weighed 9.2 g. and contained 26 percent by weight of the fumaramates by analysis. Fibers spun by extruding a solution of the polymer product in N,N-dimethylformamide into a precipitating bath had a softening point of 215° C. and showed good dye affinity.

*Example 8*

3 g. of methyl-α-acetamino acrylate and 2 g. of N-methyl-methylaleamate were added to a solution of 0.05 g. of ammonium persulfate, 0.05 g. of sodium bisulfite and 2 g. of Triton 720 (a sulfonated ether) in 75 cc. of distilled water. The reaction mixture was then heated at 35° C. for 8 hours. After cooling to room temperature, 5 g. of acrylonitrile, 0.05 g. of ammonium persulfate and 0.05 g. of sodium bisulfite were added and heating was continued for 8 hours at 35° C. The resulting polymer was obtained in a 93 percent yield and contained 29 percent by weight of methyl-α-acetamino acrylate by analysis. Fibers spun by extruding a solution of this polymer product in N,N-dimethylforamide into a precipitating bath had a softening point of 235° C. and showed excellent affinity for dyes.

Fibers obtained from a solution of a mechanical mixture of 75 parts of an acrylonitrile polymer containing 95 percent by weight acrylonitrile and 5 percent by weight vinyl acetate and 25 parts of the above polymer and extruding the solution into a precipitating bath, had a tenacity of 3 g. per denier, an extensibility of 26 percent, and a sticking temperature of 220° C.

*Example 9*

1 g. of acrylonitrile and 3 g. of N-methylmethylitaconamate were emulsified in 50 cc. of distilled water containing 0.04 g. of potassium bisulfite, 0.04 g. of ammonium persulfate and 1 g. of potassium laurate. The resulting emulsion was heated for 16 hours at 25° C. and cooled to room temperature. Then 6 g. of acrylonitrile were added along with 0.06 g. of potassium persulfate. The reaction mixture was allowed to stand for 48 hours at room temperature. The precipitated product was then filtered off, washed several times with fresh sources of distilled water and dried. There was thus obtained 9.5 g. of polymer containing 29 percent by weight of N-methylmethylitaconamate. Fibers prepared from this polymer had a softening point of 210° C. and showed good dye affinity.

*Example 10*

5 g. of N-isopropylmethacrylamide and 1 g. of N,N-dimethylmethylitaconamate were dissolved in 50 cc. of acetonitrile, containing 0.1 g. of benzoyl peroxide. The resulting solution was heated for 16 hours at 50° C. and cooled to room temperature. There was then added 1 g. of acrylonitrile and 0.01 g. of benzoyl peroxide and the reaction mixture heated for an additional 12 hours at 50° C. The product was filtered off, washed with distilled water and dried. The dried product contained 14.2 percent by weight of acrylonitrile and a stable, homogeneous solution resulted when the product was dissolved in N,N-dimethylacetamide containing polyacrylonitrile.

*Example 11*

5 g. of N-isopropylethylitaconamate and 5 g. of methylcitraconamate were emulsified in 75 cc. of distilled water containing 0.1 g. of ammonium persulfate, 0.1 g. of sodium bisulfite and 4 g. of Triton 720 (a sulfonated ether). The resulting emulsion was heated at 50° C. for 16 hours. After cooling to room temperature, 2 g. of acrylonitrile and 0.01 g. of ammonium persulfate and 0.01 g. of sodium bisulfite were added. The reaction mixture was then tumbled end over end for 12 hours at 50° C. The product was filtered off, washed with water and dried. It contained 6 percent by weight of acrylonitrile by analysis and formed homogeneous solutions in N,N-dimethylformamide with polyacrylonitrile.

*Example 12*

8 g. of N-methylisopropylcitraconamate and 2 g. of acrylonitrile were suspended in 150 cc. of distilled water containing 1.5 cc. of 7-ethyl-2-methylundecane-4-sulfonic acid sodium salt (Tergitol No. 4), 0.10 g. of ammonium persulfate and 0.10 g. of sodium metabisulfite. After tumbling the reaction mixture in a crowncapped bottle for 20 hours, in a water bath heated at 35° C., the resulting emulsion was diluted to 230 cc. with distilled water and 23 g. of acrylonitrile were added along with 1.5 cc. of 7-ethyl-2-methylundecane-4-sulfonic acid sodium salt (Tergitol No. 4), 0.23 g. of ammonium persulfate, 0.23 g. of sodium metabisulfite and 1.35 g. of 85 percent phosphoric acid. The reaction mixture was then heated for an additional 8 hours at 35° C. with tumbling, cooled to room temperature and the polymer product precipitated by the addition of a saturated sodium chloride solution to the reaction vessel. The polymer was filtered off, washed twice with hot water and then dried. The yield amounted to 31.3 g. and the product was found to contain 23 percent by weight of N-methylisopropylcitraconamate on analysis. It gave homogenous solution in N,N-dimethylformamide.

*Example 13*

9.9 g. of N-methylcitraconamate and 0.1 g. of vinyl acetate were suspended in 150 cc. of distilled water containing 2 cc. of 7-ethyl-2-methylundecane-4-sulfonic acid sodium salt (Tergitol No. 4), 0.1 g. of ammonium persulfate and 0.10 g. of sodium metabisulfite. The resulting emulsion was heated at 35° C. for 12 hours. The emulsion was then cooled to room temperature and diluted to 225 cc. with distilled water and 23 g. of acrylonitrile were added along with 2 cc. of 7-ethyl-2-methylundecane-4-sulfonic acid sodium salt (Tergitol No. 4), 0.2 g. of ammonium persulfate, 0.2 g. of sodium metabisulfite and 1.35 g. of 85 percent phosphoric acid. The reaction mixture was then heated an additional 8 hours at 35° C. The resultant polymer contained 29.5 percent by weight of N-methylmethylcitraconamate.

The polymers can be mixed with polyacrylonitrile in all proportions and dissolved to give stable solutions which do not separate into distinct layers on standing and from which fibers and films of homogeneous character can be spun, extruded or cast.

As set forth in the preceding description and examples, the resinous compositions or polymers of the invention which have from 60 to 95 percent by weight of acrylonitrile in the polymer molecule are especially useful for preparing fibers from their solutions or dopes in the mentioned solvents by wet or dry spinning processes. Good quality fibers can also be spun from dopes comprising a mixture of one or more of the resinous compositions of the invention with polyacrylonitrile, when used in such proportions that the combined total of acrylonitrile in the mixture components is in the range of 60 to 95 percent by weight. However, all of the resinous compositions or polymers of the invention, including mixtures of them with polyacrylonitrile in any proportions but preferably in the proportions of from 5 to 95 percent by weight of one or more of the polymers of the invention and from 95 to 5 percent by weight of polyacrylonitrile, can be made up into solutions or dopes with one or more of the mentioned solvents, with or without added fillers, pigments, dyes, plasticizers, etc., as desired, and the dopes coated onto a smooth surface to give flexible and tough films and sheet materials, which are useful for photographic film support and other purposes.

Other solvents which can be used for the preparation of fibers and coating compositions, etc. from the new resinous compositions or polymers of our invention and mixtures thereof with polyacrylonitrile include ethylene carbonate, ethylene carbamate, γ-butyrolactone, N-methyl-2-pyrrolidone, N,N-dimethyl methoxyacetamide, dimethyl cyanamide, N,N-dimethyl cyanoacetamide, N,N-dimethyl-β-cyanopropionamide, glycolonitrile (formaldehyde cyanohydrin), malononitrile, ethylene cyanohydrin, dimethylsulfoxide, dimethyl sulfone, tetramethylene sulfone, tetramethylene sulfoxide, N-formyl pyrrolidine, N-formyl morpholine, N,N'-tetramethylene methanephosphonamide, and the like. Generally speaking, we have found that N,N-dimethyl formamide and N,N-dimethyl acetamide are particularly advantageous solvents. The amount of polymer in the solvent for best spinning conditions can vary from about 5 to 20 percent although higher concentrations are possible at prohibitively high temperatures for practical spinning operations.

What we claim is:

1. A process for preparing resinous compositions comprising heating in the presence of a polymerization catalyst from 5 to 95 parts by weight of a dispersion comprising as the sole polymerizable components a minor proportion by weight of a monoethylenically unsaturated, polymerizable organic compound containing a $$-CH=C<$$

group and a major proportion by weight of a different monomeric compound selected from the group consisting of those represented by the following general formulas:

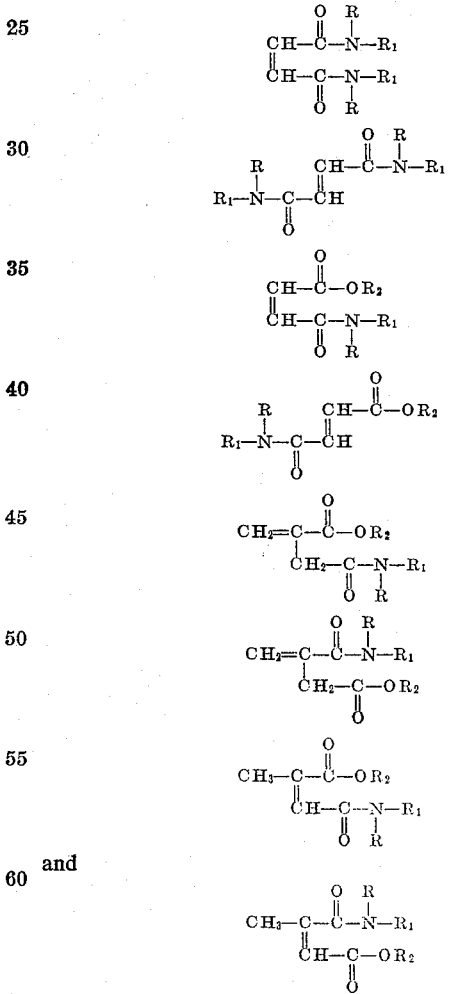

and wherein R and $R_1$ represents a member selected from the group consisting of a hydrogen atom and an alkyl group containing from 1 to 4 carbon atoms and $R_2$ represents an alkyl group containing from 1 to 4 carbon atoms, until interpolymerization is substantially complete, adding to the polymerization reaction mixture containing the interpolymer from 95 to 5 parts by weight of acrylonitrile, and heating the reaction mixture until the added acrylonitrile has polymerized to form a product containing 5 to 95 percent acrylonitrile.

2. A process for preparing resinous compositions comprising heating in the presence of a peroxide polymerization catalyst from 5 to 95 parts by weight of a dispersion comprising as the sole polymerizable components a major proportion by weight of N,N'-dimethyl fumaramide and a minor proportion by weight of a different monoethylenically unsaturated, polymerizable organic compound containing a $$-CH=C<$$

group, until interpolymerization is substantially complete, adding to the polymerization reaction mixture containing the interpolymer from 95 to 5 parts by weight of acrylonitrile, and heating the reaction mixture until the added acrylonitrile has polymerized to yield a product containing from 5 to 95 percent of acrylonitrile.

3. A process for preparing resinous compositions comprising heating in the presence of a peroxide polymerization catalyst from 5 to 95 parts by weight of a dispersion comprising as the sole polymerizable components a major proportion by weight of N-methyl methyl maleamate and a minor proportion by weight of a different monoethylenically unsaturated, polymerizable organic compound containing a $$-CH=C<$$

group, until interpolymerization is substantially complete, adding to the polymerization reaction mixture containing the interpolymer from 95 to 5 parts by weight of acrylonitrile, and heating the reaction mixture until the added acrylonitrile has polymerized to yield a product containing from 5 to 95 percent of acrylonitrile.

4. A process for preparing resinous compositions comprising heating in the presence of a peroxide polymerization catalyst from 5 to 95 parts by weight of a dispersion comprising as the sole polymerizable components a major proportion by weight of N-methyl methyl fumaramate and a minor proportion by weight of a different monoethylenically unsaturated, polymerizable organic compound containing a $$-CH=C<$$

group, until interpolymerization is substantially complete, adding to the polymerization reaction mixture containing the interpolymer from 95 to 5 parts by weight of acrylonitrile, and heating the reaction mixture until the added acrylonitrile has polymerized to yield a product containing from 5 to 95 percent of acrylonitrile.

5. A process for preparing resinous compositions comprising heating in the presence of a peroxide polymerization catalyst from 5 to 95 parts by weight of a dispersion comprising as the sole polymerizable components a major proportion by weight of N-methyl methyl itaconamate and a minor proportion by weight of a different monoethylenically unsaturated, polymerizable organic compound containing a $$-CH=C<$$

group, until interpolymerization is substantially complete, adding to the polymerization reaction mixture containing the interpolymer from 95 to 5 parts by weight of acrylonitrile, and heating the reaction mixture until the added acrylonitrile has polymerized to yield a product containing from 5 to 95 percent of acrylonitrile.

6. A process for preparing resinous compositions comprising heating in the presence of a peroxide polymerization catalyst from 5 to 95 parts by weight of a dispersion comprising as the sole polymerizable components a major proportion by weight of N-methyl isopropyl citraconamate and a minor proportion by weight of a different monoethylenically unsaturated, polymerizable organic compound containing a $$-CH=C<$$

group, until interpolymerization is substantially complete, adding to the polymerization reaction mixture containing the interpolymer from 95 to 5 parts by weight of acrylonitrile, and heating the reaction mixture until the added acrylonitrile has polymerized to yield a product containing from 5 to 95 percent of acrylonitrile.

7. A process for preparing resinous compositions comprising heating in the presence of a polymerization catalyst from 5 to 95 parts by weight of a dispersion comprising as the sole polymerizable components a major proportion by weight of a fumaramide of 4 to 20 carbon atoms and containing no substituent groups other than N-alkyl groups of 1 to 4 carbon atoms and a minor proportion by weight of a monoethylenically-unsaturated polymerizable organic compound containing a $$-CH=C<$$

group until interpolymerization is substantially complete, adding to the polymerization reaction mixture containing the interpolymer from 95 to 5 parts by weight of acrylonitrile and heating the reaction mixture until the added acrylonitrile has polymerized to form a modified polymer containing 5 to 95 percent acrylonitrile by weight.

8. A process for preparing resinous compositions which comprises heating in the presence of a polymerization catalyst from 5 to 95 parts by weight of a dispersion comprising as the sole polymerizable components a minor proportion by weight of a monoethylenically-unsaturated polymerizable organic compound containing a $$-CH=C<$$

group and a major proportion of a different monomer until interpolymerization is substantially complete, said different monomer being a maleamate of not more than 16 carbon atoms wherein the ester group contains from 1 to 4 carbon atoms and the monomer contains no substituent groups other than N-alkyl groups of 1 to 4 carbon atoms, adding to the polymerization reaction mixture containing the interpolymer from 95 to 5 parts by weight of acrylonitrile and heating the reaction mixture until the acrylonitrile has polymerized to yield a polymer containing from 5 to 95 percent acrylonitrile.

9. A process for preparing resinous compositions comprising heating in the presence of a polymerization catalyst from 5 to 95 parts by weight of a dispersion comprising as the sole polymerizable components a major proportion of a fumaramate of not more than 16 carbon atoms wherein the ester group contains 1 to 4 carbon atoms and containing no substituent groups other than N-alkyl groups of 1 to 4 carbon atoms and a minor proportion of a different monoethylenically-unsaturated polymerizable organic compound containing a $$-CH=C<$$

group, until interpolymerization is substantially complete, adding to the polymerization reaction mixture containing the interpolymer from 95 to 5 parts by weight of acrylonitrile and heating the reaction mixture until the added acrylonitrile has polymerized to yield a modified polymer containing from 5 to 95 percent by weight of acrylonitrile.

10. A process for preparing resinous compositions comprising heating in the presence of a polymerization catalyst from 5 to 95 parts by weight of a dispersion comprising as the sole polymerizable components a major proportion of an itaconamate of not more than 17 carbon atoms wherein the ester group contains 1 to 4 carbon atoms and containing no substituent groups other than N-alkyl groups of 1 to 4 carbon atoms and a minor proportion of a different monoethylenically unsaturated polymerizable organic compound containing a $$-CH=C<$$

group, until interpolymerization is substantially complete, adding to the polymerization reaction mixture containing the interpolymer from 95 to 5 parts by weight of acrylonitrile and heating the reaction mixture until the added acrylonitrile has polymerized to yield a modified polymer containing 5 to 95 percent acrylonitrile.

11. A process for preparing resinous compositions comprising heating in the presence of a polymerization catalyst from 5 to 95 parts by weight of a dispersion comprising as the sole polymerizable components a major proportion of a citraconamate of not more than 17 carbon atoms wherein the ester group contains from 1 to 4 carbon atoms and containing no substituent groups other than N-alkyl groups of 1 to 4 carbon atoms and a minor proportion of a different monoethylenically unsaturated polymerizable organic compound containing a $$-CH=C<$$

group until interpolymerization is substantially complete, adding to the polymerization reaction mixture containing the interpolymer from 95 to 5 parts by weight of acrylonitrile and heating the reaction mixture until the added acrylonitrile has polymerized to yield a modified polymer containing 5 to 95 percent by weight of acrylonitrile.

12. A modified resinous polymer containing from 5 to 95 percent by weight of acrylonitrile and having the structure and composition of a polymer prepared in accordance with the process of claim 1.

13. A modified resinous polymer containing 5 to 95 percent by weight of acrylonitrile and having the structure and composition of a polymer obtained in accordance with the process of claim 2.

14. A modified resinous polymer containing 5 to 95 percent acrylonitrile and having the structure and composition of a polymer obtained by the process of claim 3.

15. A modified resinous polymer containing 5 to 95 percent by weight of acrylonitrile and having the structure and composition of a polymer obtained by the process of claim 4.

16. A modified resinous polymer containing 5 to 95 percent by weight of acrylonitrile and having the structure and composition of a polymer obtained by the process of claim 5.

17. A modified resinous polymer containing 5 to 95 percent by weight of acrylonitrile and having the structure and composition of a polymer obtained by the process of claim 6.

References Cited in the file of this patent
UNITED STATES PATENTS 2,620,324    Coover et al. _____ Dec. 2, 1952